US012803105B2

(12) United States Patent
Wang et al.

(10) Patent No.: US 12,803,105 B2
(45) Date of Patent: Nov. 17, 2026

(54) END COVER, END COVER ASSEMBLY, BATTERY CELL, BATTERY, AND ELECTRIC DEVICE

(71) Applicant: CONTEMPORARY AMPEREX TECHNOLOGY (HONG KONG) LIMITED, Hong Kong (CN)

(72) Inventors: Xuehui Wang, Ningde City (CN); Mingguang Gu, Ningde City (CN); Xiaobo Chen, Ningde City (CN); Xiongwei Gao, Ningde City (CN); Yucang Hao, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 572 days.

(21) Appl. No.: 18/460,716

(22) Filed: Sep. 5, 2023

(65) Prior Publication Data

US 2023/0411779 A1 Dec. 21, 2023

Related U.S. Application Data

(63) Continuation of application No. PCT/CN2022/114233, filed on Aug. 23, 2022.

(30) Foreign Application Priority Data

Sep. 24, 2021 (CN) ......................... 202122325362.6

(51) Int. Cl.
*H01M 50/342* (2021.01)
*H01M 50/152* (2021.01)
*H01M 50/55* (2021.01)

(52) U.S. Cl.
CPC ..... *H01M 50/3425* (2021.01); *H01M 50/152* (2021.01); *H01M 50/55* (2021.01)

(58) Field of Classification Search
CPC ........... H01M 50/3425; H01M 50/152; H01M 50/55; H01M 2220/20; H01M 2220/30;
(Continued)

(56) References Cited

U.S. PATENT DOCUMENTS 4,722,874 A * 2/1988 Marchak ........... H01M 50/3425 220/89.2
2016/0293917 A1* 10/2016 Matsudo .................. H01G 9/12
(Continued)

FOREIGN PATENT DOCUMENTS

CN 201868519 U 6/2011
CN 203562463 * 4/2014
(Continued)

OTHER PUBLICATIONS

Notice of Reasons for Refusal received in the corresponding Japanese Application 2023-533708, mailed on Jul. 23, 2024.
(Continued)

*Primary Examiner* — Lisa S Park
(74) *Attorney, Agent, or Firm* — K&L Gates LLP

(57) ABSTRACT

Provided are an end cover, an end cover assembly, a battery cell, a battery, and an electric device. The end cover includes: two through holes, running through the end cover for mounting electrode terminals; a depression, where the depression is formed by a surface of the end cover recessing in a thickness direction, and a bottom wall of the depression forms a pressure relief mechanism; and a weak portion, disposed on the pressure relief mechanism, where the pressure relief mechanism is configured to crack along the weak portion when internal pressure of the battery cell reaches a threshold; where depth of the weak portion gradually decreases on one or two sides of a perpendicular bisector of a connecting line of the two through holes in a direction leaving the perpendicular bisector.

16 Claims, 6 Drawing Sheets

(58) Field of Classification Search
CPC ............. H01M 50/107; H01M 50/247; H01M 50/249; Y02E 60/10
See application file for complete search history.

(56) References Cited

U.S. PATENT DOCUMENTS

| | | | |
|---|---|---|---|
| 2019/0296271 | A1 | 9/2019 | Jiang |
| 2019/0296281 | A1 | 9/2019 | Elsberry |

FOREIGN PATENT DOCUMENTS

| | | | | |
|---|---|---|---|---|
| CN | 203562463 | U | | 4/2014 |
| CN | 207398200 | U | | 5/2018 |
| CN | 111146371 | A | | 5/2020 |
| CN | 215578755 | U | | 1/2022 |
| JP | H10284035 | A | | 10/1998 |
| JP | 2002260622 | A | | 9/2002 |
| JP | 2005276838 | A | | 10/2005 |
| JP | 2005340156 | A | | 12/2005 |
| JP | 2006054299 | A | | 2/2006 |
| JP | 2006338979 | A | | 12/2006 |
| JP | 2010-40328 | | * | 2/2010 |
| JP | 2014186920 | A | | 10/2014 |
| KR | 1020120016469 | A | | 2/2012 |

OTHER PUBLICATIONS

Notice of Reasons for Refusal received in the corresponding Japanese Application 2023-533708, mailed on Oct. 1, 2024.
The extended European search report received in the counterpart European application 22871725.2, mailed on Mar. 24, 2025.
International Search Report received in the corresponding International Application PCT/CN2022/114233, mailed Nov. 25, 2022.
Written Opinion received in the corresponding International Application PCT/CN2022/114233, mailed Nov. 25, 2022.
Notice to Grant Patent Right to Utility Module Application received in the corresponding Chinese Application 202122325362.6, mailed Dec. 22, 2021.
Notice of Grant (with English Machine Translation), mailed Aug. 5, 2025, for corresponding Japanese Patent Application Serial No. 2023-533708.
Notice of Reasons for Refusal received in the counterpart JP application 2023-533708, dated Apr. 1, 2025, 6 pages with English translation.
Notice of Opinion Submission received in the counterpart KR application 10-2023-7019297, dated Mar. 31, 2025, 11 pages with English translation.

* cited by examiner

END COVER, END COVER ASSEMBLY, BATTERY CELL, BATTERY, AND ELECTRIC DEVICE

CROSS-REFERENCE TO RELATED APPLICATIONS

This application is a continuation of International Application PCT/CN2022/114233, filed Aug. 23, 2022, which claims priority to Chinese Patent Application No. 202122325362.6, filed on Sep. 24, 2021 and entitled "END COVER, END COVER ASSEMBLY, BATTERY CELL, BATTERY, AND ELECTRIC DEVICE", which is incorporated herein by reference in its entirety.

TECHNICAL FIELD

This application relates to the field of battery technologies, and specifically, to an end cover, an end cover assembly, a battery cell, a battery, and an electric device.

BACKGROUND

In the environment of pursuing energy conservation and emission reduction, electric vehicles, with the advantage of energy conservation and environmental protection, have become a new development trend of the automobile industry and is an important part of sustainable development of the automobile industry. In the use of electric vehicles and other electric devices, batteries in them are likely to have safety problems during charging and discharging in the case of an abnormal internal pressure rise. Safety of the batteries is in connection with safety of the devices and users. Therefore, how safety of the batteries is improved is an important research direction.

SUMMARY

This application is intended to provide an end cover, an end cover assembly, a battery cell, a battery, and an electric device, to improve safety of a battery.

Embodiments of this application are implemented as follows.

According to a first aspect, an embodiment of this application provides an end cover, applied to a battery cell and including:

two through holes, running through the end cover for mounting electrode terminals;

a depression, where the depression is formed by a surface of the end cover recessing in a thickness direction, and a bottom wall of the depression forms a pressure relief mechanism; and a weak portion, disposed on the pressure relief mechanism, where the pressure relief mechanism is configured for relieving internal pressure of the battery cell; where depth of the weak portion gradually decreases on one or two sides of a perpendicular bisector of a connecting line of the two through holes in a direction leaving the perpendicular bisector.

An existing pressure relief mechanism is generally connected to an end cover after independently formed, such that the joint is likely to have a connection defect. According to the end cover provided in this application, the pressure relief mechanism is directly formed on the end cover without connection, avoiding connection defects. As thickness of the pressure relief mechanism decreases at the weak portion, the weak portion becomes deeper and the pressure relief mechanism becomes thinner at the weak portion. The pressure relief mechanism is configured for actively or passively relieving the internal pressure of the battery cell. Optionally, when the internal pressure of the battery cell reaches a threshold, the pressure relief mechanism cracks along the weak portion to relieve the internal pressure of the battery cell.

A weak portion of the existing pressure relief mechanism is likely to affect structural strength of the end cover. Depth of the weak portion in this application is largest only locally, and is smaller in the rest regions. As the depth of the weak portion decreases, the thickness of the pressure relief mechanism gradually increases, which improves structural strength of the pressure relief mechanism, thereby improving the structural strength of the end cover.

When the internal pressure of the battery cell increases, the end cover swells and deforms. The perpendicular bisector of the connecting line of the two through holes is the stress deformation center line of the end cover, and the end cover has a stress concentration on the stress deformation center line. With the deepest position of the weak portion of the pressure relief mechanism set on the perpendicular bisector of the two through holes, when the internal pressure of the battery cell reaches the threshold, the largest stress on the end cover acts on the deepest position of the weak portion, which ensures that the weak portion of the pressure relief mechanism cracks at the deepest position. After the weak portion cracks, under the internal pressure of the battery cell, the pressure relief mechanism is likely to continue to crack along the weak portion, which increases a valve opening area and realizes effective pressure relief, ensuring safety of a battery. A direction of the pressure relief mechanism cracking along the weak portion defines a valve opening direction of the pressure relief mechanism, so as to take countermeasures in advance, further improving the safety of the battery.

Therefore, the end cover provided in this application has no connection defect, the end cover has high structural strength, the pressure relief mechanism on the end cover can relieve the pressure controllably in direction, and the end cover can effectively improve the safety of the battery.

In some embodiments of this application, the perpendicular bisector of the connecting line of the two through holes passes through the middle of the weak portion.

In the foregoing technical solution, the weak portion reaches its deepest at the middle. When the internal pressure of the battery cell reaches the threshold, the pressure relief mechanism cracks along the weak portion from the middle to two sides, with a fast valve opening speed, to quickly relieve the pressure, improving the safety.

In some embodiments of this application, the weak portion is symmetrical about the perpendicular bisector.

In the foregoing technical solution, the weak portion experiences consistent stress on the two sides of the perpendicular bisector, which ensures that the pressure relief mechanism cracks along the weak portion from the middle to the two sides, and further controls the valve opening direction of the pressure relief mechanism, improving the safety.

In some embodiments of this application, the depression is symmetrical about the perpendicular bisector.

In the foregoing technical solution, the depression is symmetrical about the perpendicular bisector, and the weak portion is symmetrical about the perpendicular bisector. Therefore, the pressure relief mechanism is symmetrical about the perpendicular bisector, and has consistent structural strength and consistent stress bearing capacity on the two sides of the perpendicular bisector, which ensures that when the internal pressure of the battery cell reaches the threshold, the pressure relief mechanism is opened synchronously on the two sides, with a more accurate valve opening direction and higher safety.

In some embodiments of this application, the end cover is circular, the perpendicular bisector passes through the center of the end cover, and the weak portion extends along a circumferential direction of the end cover.

In the foregoing technical solution, the entire end cover has consistent structural strength and consistent bearing capacity at two parts on the two sides of the perpendicular bisector, which ensures that the stress on the end cover is concentrated on the perpendicular bisector. This further ensures that the end cover can first crack from the deepest position of the weak portion on the perpendicular bisector, ensuring the valve opening direction of the pressure relief mechanism and the safety of the battery.

In addition, the weak portion extends along the circumferential direction of the end cover, such that the weak portion is relatively farther away from the center of the end cover and relatively closer to an edge of the end cover. When the circular end cover deforms under the internal pressure, deformation at the central position is larger and deformation at the edge position is smaller. Therefore, under the same valve opening pressure, when the weak portion is disposed at a position closer to the edge of the end cover, depth of the weak portion needs to be set relatively large, which ensures that the pressure relief mechanism can crack along the weak portion under the internal pressure to open a valve. Because overall thickness of the end cover is small, the pressure relief mechanism and the weak portion are finer. Larger depth of the weak portion indicates smaller processing difficulty and facilitates processing.

In some embodiments of this application, the depression includes an arc wall and a straight wall, the arc wall and the straight wall form an enclosure, and the arc wall extends along the circumferential direction of the end cover.

In the foregoing technical solution, the depression is set to a bow shape. When the weak portion is processed, the arc wall can be used as a base, that is, the weak portion is processed along the arc wall, facilitating the processing. In addition, compared with a waist shape or other shapes having an arc portion, in the case of a same length of the weak portion, that is, in the case of a same length of the arc wall, the bow shape has a larger valve opening area, further improving the safety.

In some embodiments of this application, the arc wall corresponds to an arc angle less than or equal to 180°.

In the foregoing technical solution, the central position of the end cover is not in the depression, which ensures the structural strength of the end cover, and spares positions for disposing other functional components on the end cover.

In some embodiments of this application, a first spacing is present between the weak portion and the arc wall.

In the foregoing technical solution, the weak portion and the arc wall are spaced apart. When the joint of the arc wall and the bottom wall of the depression is uneven, due to the first spacing, the weak portion is not prone to have the problem of poor forming, which ensures good forming of the weak portion and that the pressure relief mechanism can crack along the weak portion.

In some embodiments of this application, a second spacing is present between the straight wall and two ends of the weak portion.

In the foregoing technical solution, when the edge of the end cover is compressed, the weak portion is not prone to deform due to the straight wall. Therefore, the weak portion is not prone to crack, and the end cover has high structural strength. When the internal pressure of the battery cell does not reach the threshold, the pressure relief mechanism is not prone to crack along the weak portion, which ensures normal use of the end cover.

In some embodiments of this application, a third spacing is present between the arc wall and an edge of the end cover.

In the foregoing technical solution, the arc wall of the depression and the edge of the end cover are spaced apart, which improves structural strength of an edge of the end cover corresponding to the arc wall.

In some embodiments of this application, the arc wall and the straight wall have an arc transition.

In the foregoing technical solution, the corner at the joint of the arc wall and the straight wall is rounded, which alleviates the problem of stress concentration at the corner, so as to prevent the end cover from being damaged from the corner of the depression when the edge of the end cover is compressed, improving the structural strength of the end cover.

In some embodiments of this application, a stepped surface is formed on a side wall of the depression, and the stepped surface extends along a circumferential direction of the depression.

When the edge of the end cover is compressed, a side wall above the stepped surface resists deformation first, and then the stress is transmitted to a side wall below the stepped surface and the bottom wall through the stepped surface. Therefore, the foregoing solution can effectively alleviate the problem of damages to the weak portion caused by the edge of the end cover being compressed, improving the structural strength of the end cover.

According to a second aspect, an embodiment of this application provides an end cover assembly, including:

- an end cover; a depression, where the depression is formed by a surface of the end cover recessing in a thickness direction, a bottom wall of the depression forms a pressure relief mechanism, and the depression includes an arc wall extending along a circumferential direction of the end cover; and a weak portion, configured to crack when the pressure relief mechanism is actuated, where the weak portion corresponds to the arc wall in shape.

The end cover assembly provided in this application has high structural strength and can effectively open a valve to relieve pressure controllably in direction, improving safety of a battery.

In some embodiments of this application, the weak portion is an arc, and depth of the weak portion varies in an extension direction of the circumference of the arc.

In the foregoing technical solution, the disposition form of the weak portion matches the shape of the arc wall, which facilitates processing. In addition, the depth of the weak portion varies in the extension direction of the circumference of the arc, which helps the weak portion crack, helping the pressure relief mechanism relieve internal pressure of a battery cell.

In some embodiments of this application, the end cover assembly further includes electrode terminals, the electrode terminal includes a straight first wall, the depression further includes a straight wall connecting two ends of the arc wall, and the first wall is substantially parallel to the straight wall.

In the foregoing technical solution, the first wall is substantially parallel to the straight wall, such that distance between the depression and the electrode terminal is small, which reduces the space occupied, and a cracking direction of the pressure relief mechanism can be limited, which reduces the risk of contact between the pressure relief mechanism and the electrode terminal caused by damage of the pressure relief mechanism.

In some embodiments of this application, in directions extending from the middle part to the two ends of the arc wall, depth of the weak portion gradually decreases.

In the foregoing technical solution, the depth of the weak portion is set in the foregoing manner. When the pressure relief mechanism is actuated, the weak portion cracks from the center to the two ends of the arc wall, which limits the cracking direction of the pressure relief mechanism, helping the pressure relief mechanism relieve the pressure.

In some embodiments of this application, the end cover assembly further includes two through holes, the through hole is configured for mounting the electrode terminal, and depth of the weak portion gradually decreases on one or two sides of a perpendicular bisector of a connecting line of the two through holes in a direction leaving the perpendicular bisector.

In the foregoing technical solution, the deepest position of the weak portion is on the perpendicular bisector. When the pressure relief mechanism is actuated, the weak portion cracks in the direction leaving the perpendicular bisector from the position corresponding to the perpendicular bisector, which helps the pressure relief mechanism quickly relieve the pressure, improving the safety.

According to a third aspect, an embodiment of this application provides a battery cell, including:

a housing with an opening; and the end cover assembly as described above, where the end cover closes the opening.

According to the battery cell provided in this application, the end cover is not prone to be damaged, the overall structure is stable, and the pressure relief mechanism on the end cover can effectively open a valve to relieve pressure controllably in direction, with high safety.

In some embodiments of this application, the depression is disposed on a side of the end cover facing away from the housing.

In the foregoing technical solution, the depression is formed by an outer surface of the end cover recessing, such that the pressure relief mechanism is far away from the outer surface of the end cover, and is not prone to come into contact with other objects, to avoid being damaged.

According to a fourth aspect, an embodiment of this application provides a battery, including the foregoing end cover or the foregoing end cover assembly.

The battery provided in this application has the foregoing battery cell with high safety, and therefore the battery has high safety and stable performance.

According to a fifth aspect, an embodiment of this application provides an electric device, including the foregoing battery.

The electric device provided in this application uses the battery with high safety and stable performance to operate stably.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following descriptions show merely some embodiments of this application, and persons of ordinary skill in the art may still derive other drawings from the accompanying drawings without creative efforts.

Figure 1:
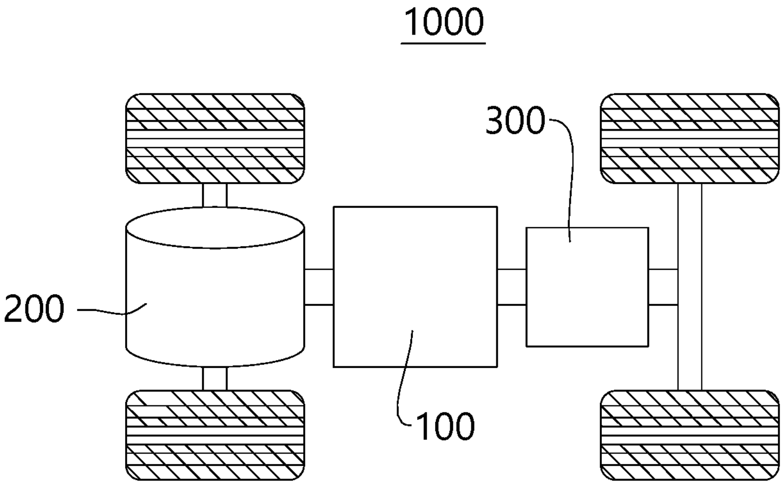
FIG. 1 is a schematic structural diagram of a vehicle according to an embodiment of this application.

The accompanying drawings are not drawn to scale.

Reference signs: 1000. vehicle; 100. battery; 200. motor; 300. controller; 101. box; 1011. first portion; 1012. second portion; 102. battery module; 1. battery cell; 11. electrode assembly; 12. housing; 121. opening; 13. end cover assembly; 131. end cover; 132. electrode terminal; 1321. first wall; 133. depression; 1331. arc wall; 1332. straight wall; 1333. stepped surface; 134. pressure relief mechanism; 1341. weak portion; 135. through hole; 136. protective film; L1. first spacing; L2. second spacing; L3. third spacing; α. perpendicular bisector; β. thickness direction of end cover; and γ. arc angle.

DESCRIPTION OF EMBODIMENTS

The following describes in detail the embodiments of technical solutions in this application with reference to the accompanying drawings. The following embodiments are merely used to describe the technical solutions in this application more clearly, and therefore are merely used as examples and do not constitute any limitation on the protection scope of this application.

Unless otherwise defined, all technical and scientific terms used herein shall have the same meanings as commonly understood by persons skilled in the art to which this application belongs. The terms used herein are merely intended to describe the specific embodiments rather than to limit this application. The terms "include", "have", and any other variations thereof in the specification, the claims, and the foregoing brief description of drawings of this application are intended to cover non-exclusive inclusions.

In the descriptions of the embodiments of this application, the terms "first", "second", and the like are merely intended to distinguish between different objects, and shall not be understood as any indication or implication of relative importance or any implicit indication of the number, specific sequence, or primary-secondary relationship of the technical features indicated. In the descriptions of the embodiments of this application, "a plurality of" means more than two, unless otherwise specifically defined.

In this specification, reference to "embodiment" means that specific features, structures, or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. Persons skilled in the art explicitly and implicitly understand that the embodiments described herein may be combined with other embodiments.

In the descriptions of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the descriptions of the embodiments of this application, the term "a plurality of" means more than two (inclusive). Similarly, "a plurality of groups" means more than two (inclusive) groups, and "a plurality of pieces" means more than two (inclusive) pieces, unless otherwise specifically defined.

In the descriptions of the embodiments of this application, the orientations or positional relationships indicated by the technical terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships shown in the accompanying drawings. These terms are merely for ease and brevity of description of the embodiments of this application rather than indicating or implying that the apparatuses or elements mentioned must have specific orientations or must be constructed or manipulated according to specific orientations, and therefore shall not be construed as any limitation on the embodiments of this application.

In the descriptions of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or an electrical connection, and may refer to a direct connection, an indirect connection via an intermediate medium, an internal communication between two elements, or an interaction between two elements. Persons of ordinary skill in the art can understand specific meanings of these terms in the embodiments of this application as appropriate to specific situations.

The battery mentioned in the embodiments of this application is a single physical module that includes one or more battery cells for providing a higher voltage and capacity. For example, the battery mentioned in this application may include a battery module, a battery pack, or the like. A battery generally includes a box for packaging one or more battery cells. The box can prevent liquids or other foreign matter from affecting charging or discharging of the battery cell.

The battery cell includes an electrode assembly and an electrolyte. The electrode assembly includes a positive electrode plate, a negative electrode plate, and a separator. Working of the battery cell mainly relies on migration of metal ions between the positive electrode plate and the negative electrode plate. The positive electrode plate includes a positive electrode current collector and a positive electrode active substance layer. The positive electrode active substance layer is applied on a surface of the positive electrode current collector. The part of the current collector uncoated with the positive electrode active substance layer protrudes out of the part of the current collector coated with the positive electrode active substance layer and serves as a positive tab. A lithium-ion battery is used as an example, for which, the positive electrode current collector may be made of aluminum, and the positive electrode active substance may be lithium cobalt oxide, lithium iron phosphate, ternary lithium, lithium manganate oxide, or the like. The negative electrode plate includes a negative electrode current collector and a negative electrode active substance layer. The negative electrode active substance layer is applied on a surface of the negative electrode current collector. The part of the current collector uncoated with the negative electrode active substance layer protrudes out of the part of the current collector coated with the negative electrode active substance layer and serves as a negative tab. The negative electrode current collector may be made of copper, and the negative electrode active substance may be carbon, silicon, or the like. To allow a large current to pass through without any fusing, multiple positive tabs are provided and stacked together, and multiple negative tabs are provided and stacked together. The separator may be made of PP, PE, or the like. In addition, the electrode assembly may be a winding structure or a laminated structure, but the embodiments of this application are not limited thereto. For the development of battery technologies, many design factors need to be considered, for example, performance parameters such as energy density, cycle life, discharge capacity, and charge and discharge rate, as well as safety of a battery.

For a battery cell, main safety hazards are in the charging and discharging processes. In addition, a suitable ambient temperature also needs to be designed. To effectively avoid unnecessary losses, triple protective measures are usually provided for the battery cell. Specifically, the protective measures include at least a switch element, selection of an appropriate separator material, and a pressure relief mechanism. The switch element is an element that can stop charging or discharging of the battery when temperature or resistance in the battery cell reaches a specific threshold. The separator is configured to separate the positive electrode plate and the negative electrode plate. Micronscale (even nanoscale) micropores attached to the separator can be automatically dissolved when temperature rises to a specified value, so that metal ions cannot pass through the separator, and an internal reaction in the battery cell is terminated.

The pressure relief mechanism is an element or part that is actuated when internal pressure or temperature of the battery cell reaches a predetermined threshold, so as to relieve the internal pressure or temperature. Design of the threshold varies with different design requirements. The threshold may depend on the material used for one or more of a positive electrode plate, a negative electrode plate, an electrolyte, and a separator in the battery cell. "Actuate" mentioned in this application means that the pressure relief mechanism is put into an action or is activated to a given state such that the internal pressure and temperature of the battery cell is relieved. The action that the pressure relief mechanism is put into may include but is not limited to, for example, cracking, breaking, tearing, or opening at least part of the pressure relief mechanism. When the pressure relief mechanism is actuated, high-temperature and high-pressure substances inside the battery cell are discharged as emissions from an actuated site. In this way, the battery cell can relieve its pressure under controllable pressure or temperature, thereby avoiding more serious potential incidents. The emissions from the battery cell mentioned in this application include but are not limited to: electrolyte, fragments of positive and negative electrode plates and separator because of dissolution or breaking, and high-temperature and high-pressure gases and flames produced by reactions.

The pressure relief mechanism in the battery cell greatly affects the safety of the battery. For example, when a short circuit, overcharging, or the like occurs, thermal runaway may be caused inside the battery cell, resulting in a sudden rise in pressure or temperature. In this case, the pressure relief mechanism can be actuated to make the internal pressure and temperature be relieved to the outside, thus preventing the battery cell from exploding and catching fire. The pressure relief mechanism may be in a form of an explosion-proof valve, a gas valve, a pressure relief valve, a safety valve, or the like, and may specifically employ an element or part sensitive to pressure or temperature. To be specific, when the internal pressure or temperature of the battery cell reaches the predetermined threshold, the pressure relief mechanism performs an action or a weak structure provided in the pressure relief mechanism is destroyed, thereby forming a through hole or a channel for relieving the internal pressure or temperature.

Currently, the channel for relieving pressure is generally disposed on the end cover, and the pressure relief mechanism is connected to the end cover to close the channel for relieving pressure. However, an existing battery cell provided with a pressure relief mechanism still has safety risks. For example, fragments generated when the pressure relief mechanism is actuated fly, emissions (for example, high-temperature and high-pressure gas) generated when the pressure relief mechanism is actuated rush out, and the battery cell is likely to leak out electrolyte. It is found through further research that because the end cover needs to be provided with a channel for a pressure relief mechanism, structural strength is decreased, and the end cover is likely to be damaged to cause electrolyte leakage. In addition, the joint of the pressure relief mechanism and the end cover is likely to have a connection defect, which causes electrolyte leakage due to loose connection, for example, a weld joint between the pressure relief mechanism and the end cover has bubbles, cracks, and the like.

In view of this, to resolve safety problems caused by actuation of a pressure relief mechanism and electrolyte leakage, this application provides an end cover. A surface of the end cover is recessed in a thickness direction to form a depression, a bottom wall of the depression forms a pressure relief mechanism, and a weak portion is disposed on the pressure relief mechanism, where the pressure relief mechanism is configured to crack along the weak portion when internal pressure of a battery cell reaches a threshold. Two through holes for mounting electrode terminals are formed on the end cover, and a perpendicular bisector of a connecting line of the two through holes intersects with the weak portion, where depth of the weak portion gradually decreases on one or two sides of the perpendicular bisector of the connecting line of the two through holes in a direction leaving the perpendicular bisector.

According to the end cover provided in this application, the depression is disposed on the end cover, such that the bottom wall of the depression is thinner than the end cover. The thinner bottom wall of the depression is used as the pressure relief mechanism, and the pressure relief mechanism is directly formed on the end cover without connection, such that there is no connection defect and no electrolyte leakage caused by the connection defect.

The weak portion is further disposed on the pressure relief mechanism, such that thickness of the pressure relief mechanism at the weak portion further decreases. The weak portion may be a concave portion formed on the pressure relief mechanism. The concave portion is used to decrease the thickness of the pressure relief mechanism (that is, thickness of the bottom wall of the depression), and may be an indentation, or a slot formed on the pressure relief mechanism by compressing, stamping, integral casting, or the like. In the prior art, a weak portion of a pressure relief mechanism has a consistent depth all over. However, in this application, the depth of the weak portion varies. The weak portion reaches its deepest only at the intersection with the perpendicular bisector of the connecting line of the two through holes, and in the direction leaving the perpendicular bisector, the depth of the weak portion gradually decreases, such that the thickness of the pressure relief mechanism at the weak portion gradually increases, which improves structural strength of the pressure relief mechanism, thereby improving structural strength of the end cover. Therefore, when the internal pressure of the battery cell does not reach the threshold, the end cover is not prone to be accidentally damaged to cause electrolyte leakage.

When the internal pressure of the battery cell increases, the end cover swells and deforms. The perpendicular bisector of the connecting line of the two through holes is the stress deformation center line of the end cover, and the end cover has a stress concentration on the stress deformation center line. With the deepest position of the weak portion of the pressure relief mechanism set on the perpendicular bisector of the two through holes, when the internal pressure of the battery cell reaches the threshold, the largest stress on the end cover acts on the deepest position of the weak portion, which ensures that the weak portion of the pressure relief mechanism cracks at the deepest position. After the weak portion cracks, under the internal pressure of the battery cell, the pressure relief mechanism is likely to continue to crack along the weak portion, which increases a valve opening area and realizes effective pressure relief, ensuring safety of a battery.

In addition, setting the depth of the weak portion determines an initial cracking position and a cracking direction of the weak portion, which defines a valve opening direction of the pressure relief mechanism, so as to take countermeasures in advance, and alleviate the safety problems caused by flying of fragments and rush of emissions when the pressure relief mechanism is actuated, further improving the safety of the battery.

The end cover disclosed in the embodiments of this application is applied to a battery cell. The battery cell may include a lithium-ion secondary battery, a lithium-ion primary battery, a lithium-sulfur battery, a sodium-lithium-ion battery, a sodium-ion battery, a magnesium-ion battery, or the like, which is not limited in the embodiments of this application. The battery cell may be cylindrical, flat, cuboid, or of other shapes, which is not limited in the embodiments of this application either.

The battery cell disclosed in the embodiments may be used without limitation in electric devices such as vehicles, ships, or aircrafts. The battery cell, the battery, and the like disclosed in this application may be used to constitute a power supply system of the electric device, which helps to alleviate safety risks caused by electrolyte leakage and charging and discharging of the battery, and improve safety of performance and service life of the battery.

An embodiment of this application provides an electric device that uses a battery as a power source. The electric device may be but is not limited to a mobile phone, a tablet, a notebook computer, an electric toy, an electric tool, an electric bicycle, an electric vehicle, a ship, or a spacecraft. The electric toy may be a fixed or mobile electric toy, for example, a game console, an electric toy car, an electric toy ship, and an electric toy airplane. The spacecraft may include an airplane, a rocket, a space shuttle, a spaceship, and the like.

For ease of description, the electric device of an embodiment of this application being a vehicle is used as an example for description of the following embodiments.

For example, as shown in FIG. 1, FIG. 1 shows a vehicle 1000 according to an embodiment of this application. The vehicle 1000 may be a fuel vehicle, a gas vehicle, or a new energy vehicle, and the new energy vehicle may be a battery electric vehicle, a hybrid electric vehicle, an extended-range electric vehicle, or the like. A battery 100, a controller 300, and a motor 200 may be disposed inside the vehicle 1000, and the controller 300 is configured to control the battery 100 to supply power to the motor 200. For example, the battery 100 may be disposed at the bottom, front, or rear of the vehicle 1000. The battery 100 may be configured to supply power to the vehicle 1000. For example, the battery 100 may be used as an operational power source for the vehicle 1000 which is configured for a circuit system of the vehicle 1000, for example, to satisfy power needs of start, navigation, and running of the vehicle 1000. In another embodiment of this application, the battery 100 may be used not only as the operational power source for the vehicle 1000, but also as a driving power source for the vehicle 1000, replacing or partially replacing fossil fuel or natural gas to provide driving traction for the vehicle 1000.

Figure 2:
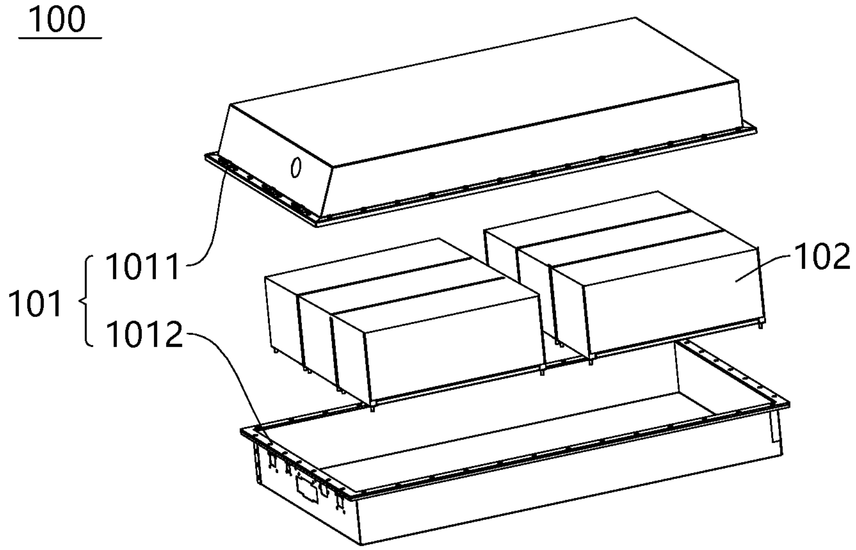
FIG. 2 is a schematic exploded view of a battery according to an embodiment of this application.
Figure 3:
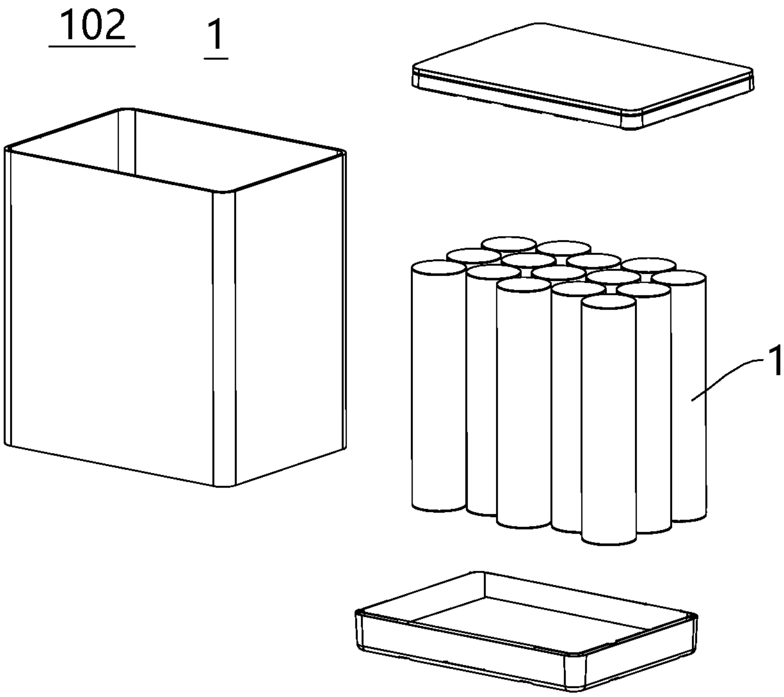
FIG. 3 is a schematic structural diagram of a battery module according to an embodiment of this application.

To meet different power usage requirements, the battery 100 may include a plurality of battery cells 1, and the plurality of battery cells 1 may be connected in series, parallel, or series-parallel, where being connected in series-parallel means a combination of series and parallel connections. The battery 100 may also be referred to as a battery pack 100. Optionally, as shown in FIG. 2 and FIG. 3, a plurality of battery cells 1 may first be connected in series, parallel, or series-parallel to constitute a battery module 102, and then a plurality of battery modules 102 are connected in series, parallel, or series-parallel to constitute a battery 100. In other words, the plurality of battery cells 1 may directly constitute the battery 100, or may first constitute the battery modules 102 which then constitute the battery 100.

The battery 100 may include a plurality of battery cells 1. The battery 100 may further include a box 101 (or referred to as a cover body), the inside of the box 101 is a hollow structure, and the plurality of battery cells 1 are accommodated in the box 101. The box 101 may include two portions for accommodation (refer to FIG. 2), which are herein referred to as a first portion 1011 and a second portion 1012 respectively. The first portion 1011 and the second portion 1012 are snap-fitted together. Shapes of the first portion 1011 and the second portion 1012 may be determined according to a combination shape of the plurality of battery cells 1. Both the first portion 1011 and the second portion 1012 may have an opening. For example, the first portion 1011 and the second portion 1012 each may be a hollow cuboid with only one face having an opening, the opening of the first portion 1011 is corresponding to the opening of the second portion 1012, and the first portion 1011 and the second portion 1012 are snap-fitted to form a box 101 with an enclosed chamber. Alternatively, one of the first portion 1011 and the second portion 1012 may be a cuboid with an opening, and the other may be a cover plate structure to close the opening of the cuboid. The plurality of battery cells 1 are connected in parallel, series, or series-parallel and then placed into the box 101 formed by snap-fitting the first portion 1011 and the second portion 1012.

Optionally, the battery 100 may further include other structures. For example, the battery 100 may further include a busbar that is used to implement electrical connection between the plurality of battery cells 1, for example, in a parallel, series, or series-parallel manner. Specifically, the busbar may implement the electrical connection between the battery cells 1 by connecting electrode terminals of the battery cells 1. Further, the busbar may be fixed to the electrode terminals of the battery cells 1 by welding. Electric energy of the plurality of battery cells 1 may be further led out by a conductive mechanism that passes through the box 101. Optionally, the conductive mechanism may also belong to the busbar.

Figure 4:
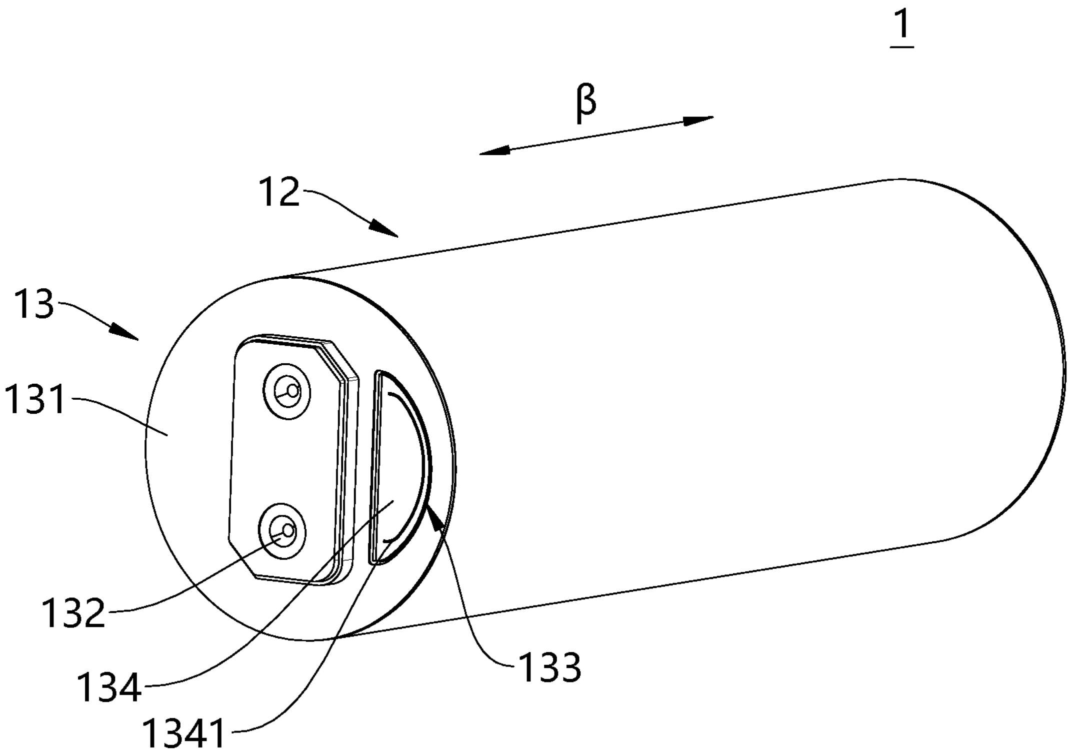
FIG. 4 is a schematic structural diagram of a battery cell according to an embodiment of this application.
Figure 5:
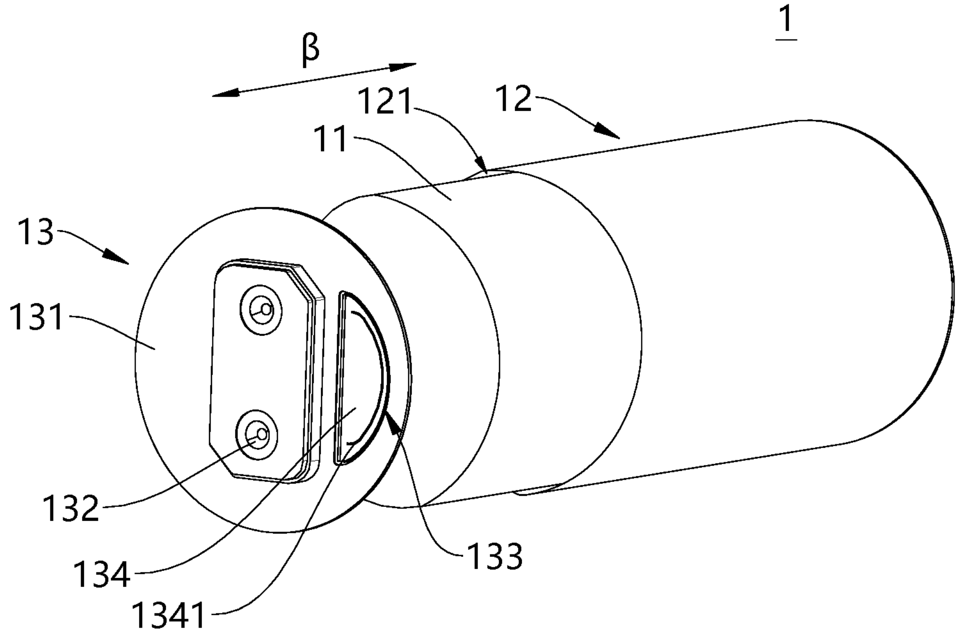
FIG. 5 is a schematic exploded view of a battery cell according to an embodiment of this application.

The following describes in detail any one of the battery cells 1. As shown in FIG. 4 and FIG. 5, the battery cell 1 includes an electrode assembly 11, a housing 12, and an end cover assembly 13.

The electrode assembly 11 is a component having electrochemical reactions in the battery cell 1. One battery cell 1 may include one or more electrode assemblies 11. The electrode assembly 11 is mainly formed by winding or stacking a positive electrode plate and a negative electrode plate, and a separator is generally disposed between the positive electrode plate and the negative electrode plate. Parts of the positive electrode plate and the negative electrode plate that have active substances constitute a main body of the electrode assembly 11, while parts of the positive electrode plate and the negative electrode plate that have no active substances each constitute a tab. A positive tab and a negative tab may both be located on one end of the main body or be located on two ends of the main body respectively. During charging and discharging of the battery 100, a positive electrode active substance and a negative electrode active substance react with an electrolyte, and the tabs are connected to electrode terminals 132 to form a current loop.

The housing 12 is an assembly configured to form an internal environment of the battery cell 1 by fitting with an end cover 131, where the formed internal environment may be used to accommodate the electrode assembly 11, the electrolyte, and other components. The housing 12 and the end cover 131 may be separate components, an opening 121 may be provided on the housing 12, and the end cover 131 covers the opening 121 to form the internal environment of the battery cell 1. Without limitation, the end cover 131 and the housing 12 may alternatively be integrated. Specifically, the end cover 131 and the housing 12 may form a shared connection surface before other components are disposed inside the housing, and then the housing 12 is covered with the end cover 131 when the inside of the housing 12 needs to be enclosed. The housing 12 may be of various shapes and sizes, such as a cuboid shape, a cylindrical shape, and a hexagonal prism shape. Specifically, the shape of the housing 12 may be determined according to a specific shape and size of the electrode assembly 11. The housing 12 may be made of various materials, such as copper, iron, aluminum, stainless steel, aluminum alloy, and plastic, which are not particularly limited in the embodiments of this application.

The end cover assembly 13 is a component that covers the opening 121 of the housing 12 to isolate the internal environment of the battery cell 1 from an external environment thereof. The end cover assembly 13 includes the end cover 131, the electrode terminals 132, a pressure relief mechanism 134, and other functional components, where the end cover 131 is configured to be connected to the housing 12 to close the opening 121. Without limitation, a shape of the end cover 131 may be adapted to the shape of the housing 12 to fit the housing 12. Optionally, the end cover 131 may be made of a material with specified hardness and strength (for example, aluminum alloy), so that the end cover 131 is not prone to deform when subjected to compression and collision, allowing the battery cell 1 to have higher structural strength and improved safety performance. The end cover 131 may alternatively be made of various materials, such as copper, iron, aluminum, stainless steel, aluminum alloy, and plastic, which are not particularly limited in the embodiments of this application. In some embodiments, an insulator may also be disposed inside the end cover 131. The insulator may be configured to isolate an electrically connected component in the housing 12 from the end cover 131 to reduce the risk of short circuit. For example, the insulator may be made of plastic, rubber, or the like. The electrode terminal 132 is disposed on the end cover 131, and the electrode terminal 132 may be configured to be electrically connected to the tab of the electrode assembly 11 for outputting or inputting electric energy of the battery cell 1. The pressure relief mechanism 134 is disposed on the end cover 131, and configured for relieving internal pressure when the internal pressure or temperature of the battery cell 1 reaches a threshold.

Figure 6:
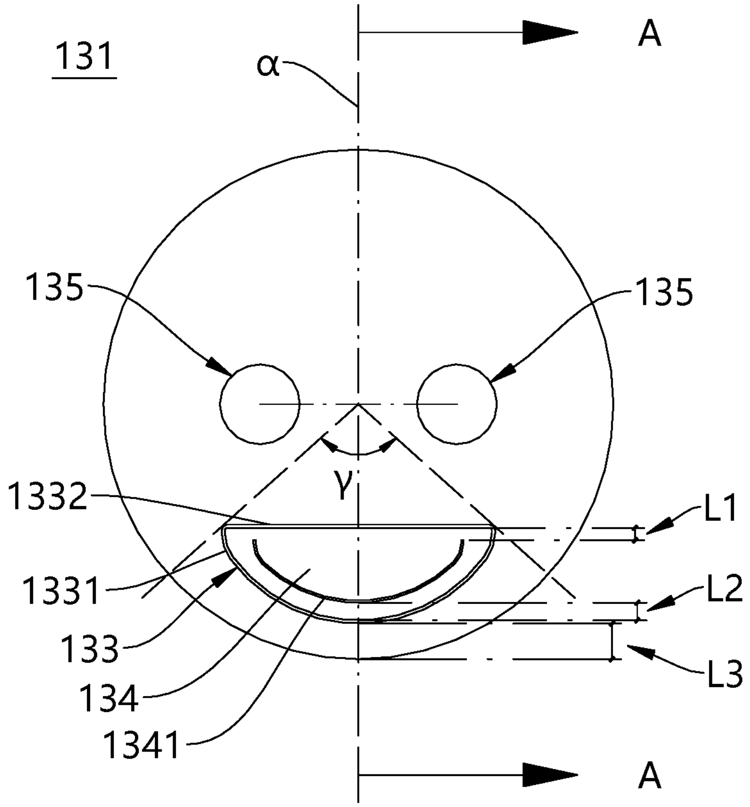
FIG. 6 is a schematic planar diagram of an end cover according to an embodiment of this application.
Figure 7:
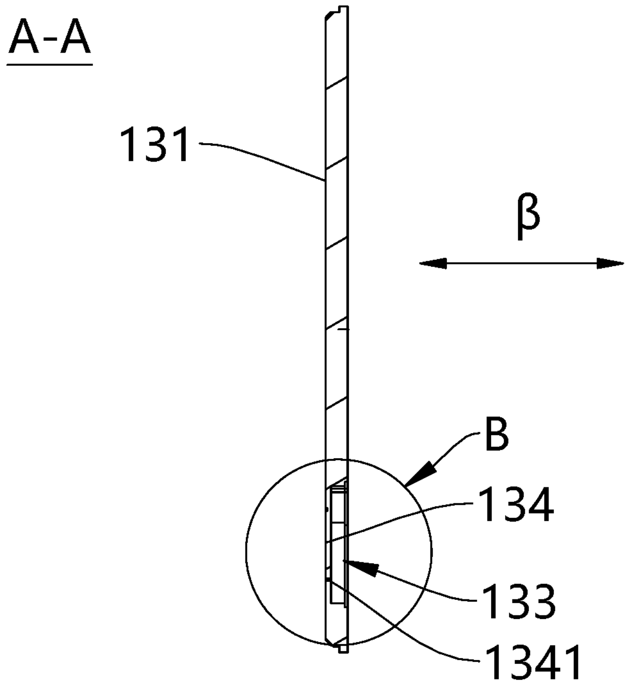
FIG. 7 is a cross-sectional view of A-A in FIG. 6.
Figure 8:
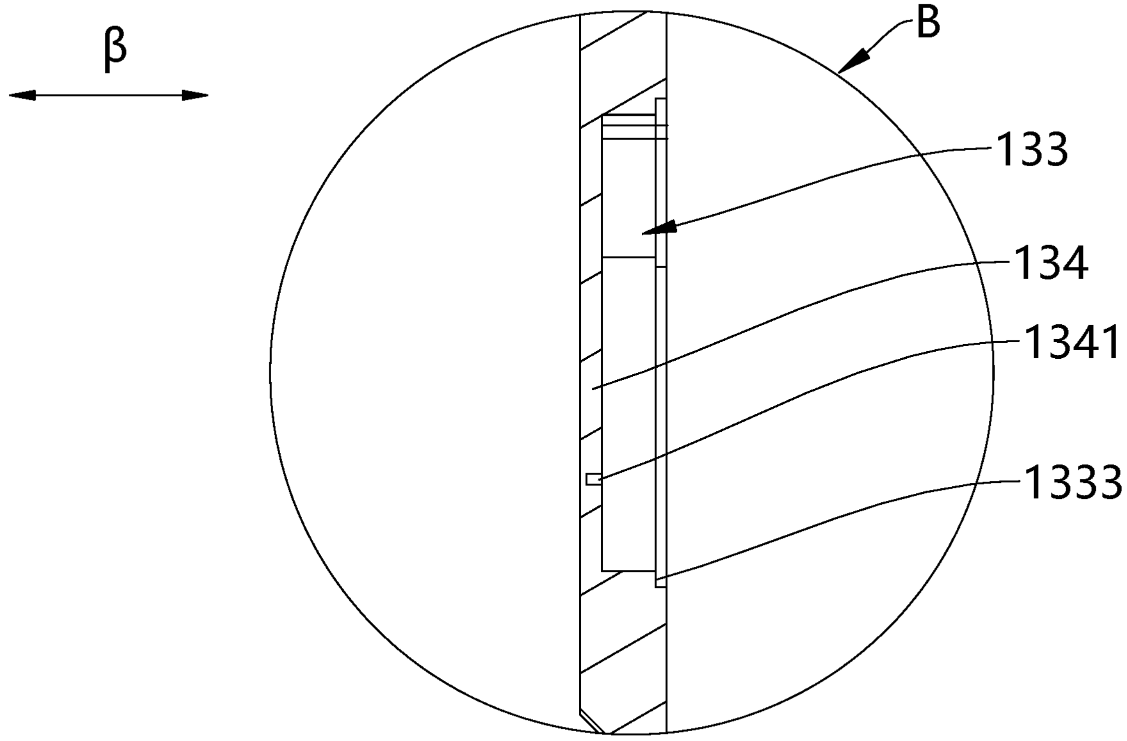
FIG. 8 is an enlarged view of part B in FIG. 7.

According to some embodiments of this application, as shown in FIG. 6, FIG. 7, and FIG. 8, this application provides an end cover 131, applied to the battery cell 1 (as shown in FIG. 5). The end cover 131 is provided with a depression 133 and two through holes 135. The depression 133 is formed by a surface of the end cover 131 recessing in a thickness direction, a bottom wall of the depression 133 forms a pressure relief mechanism 134, and a weak portion 1341 is disposed on the pressure relief mechanism 134, where the pressure relief mechanism 134 is configured to crack along the weak portion 1341 when internal pressure of the battery cell 1 reaches a threshold. The two through holes 135 run through the end cover 131 for mounting electrode terminals 132, where depth of the weak portion 1341 gradually decreases on one or two sides of a perpendicular bisector α of a connecting line of the two through holes 135 in a direction leaving the perpendicular bisector α.

As shown in the figure, a β direction is a thickness direction of the end cover, and both a recess direction of the depression 133 and a depth direction of the weak portion 1341 are in the thickness direction β of the end cover.

The pressure relief mechanism 134 is configured for actively or passively relieving the internal pressure of the battery cell 1. Optionally, the pressure relief mechanism 134 passively relieves the pressure. For example, the pressure relief mechanism 134 is configured to crack along the weak portion 1341 when the internal pressure of the battery cell 1 reaches the threshold.

As shown in FIG. 7, the depression 133 is disposed on the end cover 131, such that the bottom wall of the depression 133 is thinner than the end cover 131, and the thinner bottom wall of the depression 133 is used as the pressure relief mechanism 134. In other words, when the internal pressure of the battery cell 1 reaches the threshold, the bottom wall of the depression 133 is damaged to relieve the internal pressure. The depression 133 may be formed on the end cover 131 by cutting or the like. Alternatively, the depression 133 and the end cover 131 may be integrally formed by casting, or may be formed by stamping once, or the depression 133 is first formed by stamping raw materials, and then the end cover 131 is formed by stamping again.

As shown in FIG. 8, the weak portion 1341 is a concave portion formed on the pressure relief mechanism 134, that is, another depression 133 (for ease of differentiation, hereinafter referred to as a second depression) is formed on the bottom wall of the depression 133. The bottom wall of the depression 133 is recessed from a surface in the thickness direction β of the end cover to form the second depression, and the second depression decreases thickness of the bottom wall of the depression 133 (that is, decreases thickness of the pressure relief mechanism 134). The second depression may be an indentation disposed on a surface of the pressure relief mechanism 134, or may be formed by stamping twice on the pressure relief mechanism 134, or integrally formed with the end cover 131 by casting. The weak portion 1341 is configured to define a prior damage position of the pressure relief mechanism 134. When the internal pressure of the battery cell 1 reaches the threshold, the pressure relief mechanism 134 is preferentially damaged from the weak portion 1341 to relieve the internal pressure.

The two through holes 135 on the end cover 131 run through the end cover 131 in the thickness direction β of the end cover, the two electrode terminals 132 are mounted in the two through holes 135 respectively, and each joint of the electrode terminals 132 and the through holes 135 is sealed to prevent electrolyte leakage. Optionally, each joint of the electrode terminals 132 and the through holes 135 is provided with an insulator to prevent the end cover 131 from being charged, reducing the safety hazard of short circuit caused by the end cover 131 being charged. Polarities of the two electrode terminals 132 may be the same or different.

When the internal pressure of the battery cell 1 increases, the end cover 131 is compressed and even swells and deforms. The end cover 131 has a relatively low structural strength at the through hole 135, and the perpendicular bisector α of the connecting line of the two through holes 135 is the stress deformation center line of the end cover 131, that is, the end cover 131 has a stress concentration on the perpendicular bisector α of the connecting line of the two through holes 135. The perpendicular bisector α is a perpendicular bisector of a line segment, that is, a perpendicular line made through the midpoint of the connecting line of the two through holes 135. Without limitation, the two through holes 135 are circular, or may be of other shapes in other embodiments. The connecting line of the two through holes 135 is a line connecting the centers of the two through holes 135. For example, when the two through holes 135 are circular, the connecting line of the two through holes 135 is a line connecting the centers of the two through holes 135.

The perpendicular bisector α of the connecting line of the two through holes 135 (hereinafter referred to as the perpendicular bisector α) passes through the weak portion 1341, that is, the perpendicular bisector α intersects with the weak portion 1341, and the perpendicular bisector α and the weak portion 1341 have an intersection point. The weak portion 1341 is configured to reach its deepest at the intersection point, and the depth of the weak portion 1341 decreases on one or two sides of the perpendicular bisector α in the direction leaving the perpendicular bisector α. In other words, in an extension direction of the weak portion 1341, as a distance to the intersection point of the weak portion 1341 and the perpendicular bisector α increases, the depth of the weak portion 1341 decreases, and remaining thickness of the pressure relief mechanism 134 after being thinned by the weak portion 1341 is larger.

The pressure relief mechanism 134 is directly formed on the end cover 131, the weak portion 1341 gradually varying in depth is disposed on the pressure relief mechanism 134, and the deepest position of the weak portion 1341 is set on the perpendicular bisector α of the connecting line of the two through holes 135, such that the end cover 131 has high overall strength, and the pressure relief mechanism 134 and the end cover 131 have no connection defect, effectively alleviating the problem of electrolyte leakage. This further ensures that the pressure relief mechanism 134 on the end cover 131 can crack from the deepest position of the weak portion 1341, so as to ensure that the pressure relief mechanism 134 is effectively actuated under the internal pressure. In addition, the pressure relief mechanism 134 further cracks along the weak portion 1341 under the internal pressure of the battery cell 1, so as to increase a valve opening area. In a case that an initial damage position and a subsequent cracking direction of the pressure relief mechanism 134 are defined, a valve opening position and direction of the pressure relief mechanism 134 can be controlled, which helps making preparations for the pressure relief mechanism 134 in advance, for example, providing protection in a relieving direction of the pressure relief mechanism 134, thereby improving safety of the battery 100. A channel communicating the inside and the outside of the battery cell 1 formed after the pressure relief mechanism 134 cracks is used to discharge emissions, and the valve opening area in this application is a flow cross-section area of the channel.

According to some embodiments of this application, the perpendicular bisector α of the connecting line of the two through holes 135 passes through the middle of the weak portion 1341.

As described above, the extension direction of the weak portion 1341 and the perpendicular bisector α form an angle, and the intersection point of the weak portion 1341 and the perpendicular bisector α is at the midpoint position of the extension direction of the weak portion 1341.

The deepest position of the weak portion 1341 is the middle. Therefore, when the internal pressure of the battery cell 1 reaches the threshold, the pressure relief mechanism 134 cracks along the weak portion 1341 from the middle to two sides, with a fast valve opening speed, to quickly relieve the pressure of the battery cell 1, improving the safety.

According to some embodiments of this application, the weak portion 1341 is symmetrical about the perpendicular bisector α.

The intersection point of the weak portion 1341 and the perpendicular bisector α is at the midpoint position of the extension direction of the weak portion 1341, and the extension direction of the weak portion 1341 is perpendicular to the perpendicular bisector α, such that the weak portion 1341 is symmetrical about the perpendicular bisector α.

The perpendicular bisector α is a stress concentration line, and stresses on two sides of the stress concentration line are distributed similarly. Therefore, the weak portion 1341 experiences consistent stress on the two sides of the perpendicular bisector α, which ensures that the pressure relief mechanism 134 cracks along the weak portion 1341 from the middle to the two sides, and further controls the valve opening direction of the pressure relief mechanism 134, improving the safety.

According to some embodiments of this application, the depression 133 is symmetrical about the perpendicular bisector α.

The depression 133 being symmetrical about the perpendicular bisector α further ensures that the stress on the end cover 131 is concentrated on the perpendicular bisector α, and that the pressure relief mechanism 134 is damaged from the intersection point of the weak portion 1341 and the perpendicular bisector α, so as to control the valve opening position. When the depression 133 is symmetrical about the perpendicular bisector α and the weak portion 1341 is symmetrical about the perpendicular bisector α, the pressure relief mechanism 134 is symmetrical about the perpendicular bisector α, and has consistent structural strength and consistent stress bearing capacity on the two sides of the perpendicular bisector α, which ensures that when the internal pressure of the battery cell 1 reaches the threshold, the pressure relief mechanism 134 is opened synchronously from the intersection point of the weak portion 1341 and the perpendicular bisector α to the two sides of the perpendicular bisector α, with a more accurate valve opening direction, a faster valve opening speed, and higher safety.

According to some embodiments of this application, the end cover 131 is circular, the perpendicular bisector α passes through the center of the end cover 131, and the weak portion 1341 extends along a circumferential direction of the end cover 131.

Still refer to FIG. 6. The two through holes 135 are symmetrically arranged on the circular end cover 131, the perpendicular bisector α of the connecting line of the two through holes 135 passes through the center of the circular end cover 131, and the two through holes 135 are symmetrical about the perpendicular bisector α. The weak portion 1341 extends along the circumferential direction of the end cover 131, that is, the weak portion 1341 extends along an arc direction, and the center of the arc coincides with the center of the circular end cover 131. The coincidence in this application may be complete coincidence, or means that the center of the arc is near and almost coincides with the center of the end cover 131.

With the above arrangement, the entire end cover 131 is symmetrical about the perpendicular bisector α, and the end cover 131 has consistent structural strength and consistent bearing capacity at two parts on the two sides of the perpendicular bisector α, which ensures that the stress on the end cover 131 is concentrated on the perpendicular bisector α. This further ensures that the end cover 131 can first crack from the deepest position of the weak portion 1341 on the perpendicular bisector α, further ensuring the valve opening direction of the pressure relief mechanism 134.

When the circular end cover 131 deforms under the internal pressure, deformation at the central position (the center) is larger and deformation at the edge position is smaller. Because the weak portion 1341 extends along the circumferential direction of the end cover 131, the weak portion 1341 is relatively closer to an edge of the end cover 131 and relatively farther away from the central position of the end cover 131. When the weak portion 1341 is close to the edge of the end cover 131 with smaller deformation, under the same valve opening pressure, depth of the weak portion 1341 needs to be set relatively large, so as to ensure that the weak portion 1341 can crack. Because overall thickness of the end cover 131 is small, the pressure relief mechanism 134 and the weak portion 1341 are finer, and a high processing accuracy is required. With the depth of the weak portion 1341 set relatively large, processing becomes much easier.

According to some embodiments of this application, the depression 133 includes an arc wall 1331 and a straight wall 1332, the arc wall 1331 and the straight wall 1332 form an enclosure, and the arc wall 1331 extends along the circumferential direction of the end cover 131.

Still refer to FIG. 6. A projection of the arc wall 1331 on the end cover 131 is an arc line, and the center of the arc line coincides with the center of the circular end cover 131. The coincidence in this application may be complete coincidence, or means that the center of the arc line is near and almost coincides with the center of the end cover 131. A projection of the straight wall 1332 on the end cover 131 is a straight line segment, and two ends of the straight line segment connect two ends of the arc line to form a bow shape. In other words, a projection of the depression 133 on the end cover 131 is of a bow shape, or the depression 133 is of a bow shape.

When the weak portion 1341 is processed, for example, when the weak portion 1341 is processed on the pressure relief mechanism 134 by scoring, stamping, or the like, the arc wall 1331 is used as a base, that is, the weak portion 1341 is processed along the arc wall 1331, facilitating the processing.

After the pressure relief mechanism 134 cracks along the weak portion 1341, the pressure relief mechanism 134 is connected to the straight wall 1332 to prevent the pressure relief mechanism 134 from flying after being damaged, and an opening direction of the pressure relief mechanism 134 faces toward the edge of the end cover 131 to define that emissions are discharged in a direction toward the edge of the end cover 131.

In other embodiments, the depression 133 may alternatively be set to other shapes, for example, a waist shape. The waist shape has two arc walls 1331 extending along the circumferential direction of the end cover 131. One of the arc walls 1331 is relatively closer to the center of the end cover 131, and the other is relatively closer to the edge of the end cover 131. Optionally, the weak portion 1341 is processed along the arc wall 1331 closer to the edge of the end cover 131, such that after the pressure relief mechanism 134 cracks along the weak portion 1341, the pressure relief mechanism 134 is connected to the arc wall 1331 closer to the center of the end cover 131 to prevent the pressure relief mechanism 134 from flying after being damaged, and an opening direction of the pressure relief mechanism 134 faces toward the edge of the end cover 131 to define that emissions are discharged in the direction toward the edge of the end cover 131.

In the case of a same length of the weak portion 1341, the bow shape has a larger valve opening area than the waist shape, further improving the safety. In the case of a same valve opening area, the bow shape has a smaller extending length along the edge direction of the end cover 131 than the waist shape, the depression 133 has less influence on structural strength of the end cover 131, and thus the bow shape enables the end cover 131 to have higher structural strength.

According to some embodiments of this application, the arc wall 1331 corresponds to an arc angle $\gamma$ less than or equal to 180°.

Still refer to FIG. 6. The figure shows the arc angle $\gamma$ corresponding to the arc wall 1331 of the bow shape. The arc angle $\gamma \leq 180°$, such that the central position of the end cover 131 is not in the depression 133, which ensures the structural strength of the end cover 131, and spares positions for disposing other functional components on the end cover 131.

According to some embodiments of this application, a first spacing L1 is present between the weak portion 1341 and the arc wall 1331.

Still refer to FIG. 6. The weak portion 1341 does not cling to the joint of the arc wall 1331 and the bottom wall of the depression 133, and the first spacing L1 is present between the weak portion 1341 and the arc wall 1331. Optionally, the first spacing L1>1 mm.

With the first spacing L1 provided, a shape of the weak portion 1341 is not prone to be affected. Therefore, when the joint of the arc wall 1331 and the bottom wall of the depression 133 is uneven, the problem of poor forming of the weak portion 1341 is avoided and the weak portion 1341 is well formed, which ensures that the pressure relief mechanism 134 can crack along the weak portion 1341.

Provision of the first spacing L1 further allows the depression 133 to have a specified processing error, which prevents the weak portion 1341 from being outside the depression 133 due to a processing error.

According to some embodiments of this application, a second spacing L2 is present between the straight wall 1332 and two ends of the weak portion 1341.

Still refer to FIG. 6. The two ends of the weak portion 1341 do not extend to the joint of the straight wall 1332 and the bottom wall of the depression 133, but the second spacing L2 is present between the straight wall 1332 and the two ends of the weak portion 1341. Optionally, the second spacing L2≥0.5 mm.

Because the second spacing L2 is present between the straight wall 1332 and the two ends of the weak portion 1341, when the edge of the end cover 131 is compressed, the weak portion 1341 is not prone to deform due to the straight wall 1332. Therefore, the weak portion 1341 is not prone to crack, and the end cover 131 has high structural strength. When the internal pressure of the battery cell 1 does not reach the threshold, the pressure relief mechanism 134 is not prone to accidentally crack along the weak portion 1341.

According to some embodiments of this application, a third spacing L3 is present between the arc wall 1331 and the edge of the end cover 131.

Still refer to FIG. 6. The third spacing L3 is provided between the arc wall 1331 of the depression 133 and the edge of the end cover 131, so as to guarantee structural strength of the edge of the end cover 131 corresponding to the arc wall 1331. Optionally, the third spacing L3>3 mm.

According to some embodiments of this application, the arc wall 1331 and the straight wall 1332 have an arc transition.

Still refer to FIG. 6. The corner at the joint of the arc wall 1331 and the straight wall 1332 is rounded, such that the arc wall 1331 and the straight wall 1332 has an arc transition.

Provision of an arc transition between the arc wall 1331 and the straight wall 1332 alleviates the problem of stress concentration at the corner of the arc wall 1331 and the straight wall 1332, so as to prevent the end cover 131 from being damaged from the corner of the depression 133 when the edge of the end cover 131 is compressed, improving the structural strength of the end cover 131.

According to some embodiments of this application, a stepped surface 1333 is formed on a side wall of the depression 133, and the stepped surface 1333 extends along a circumferential direction of the depression 133.

Figure 9:
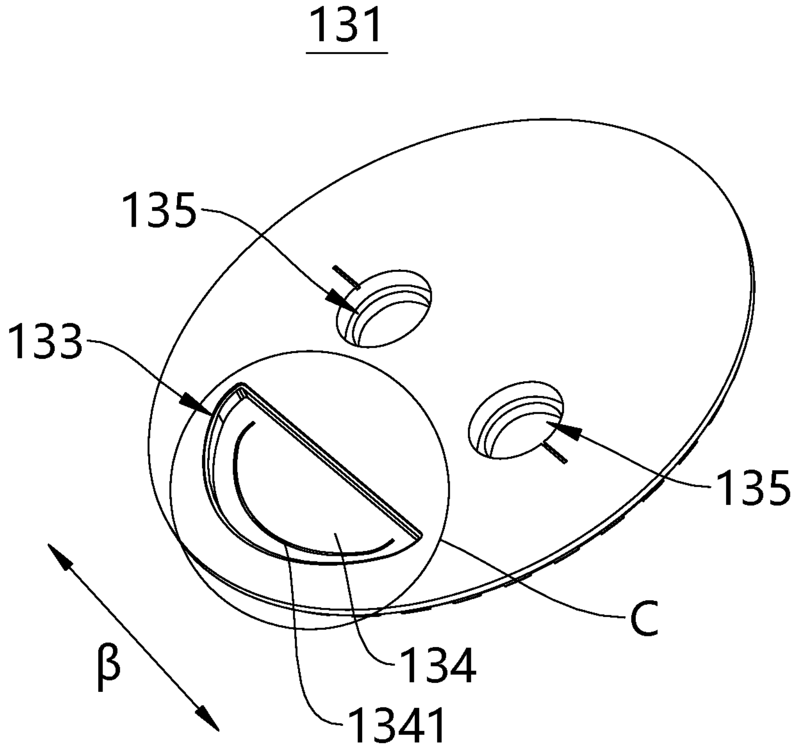
FIG. 9 is a schematic three-dimensional diagram of an end cover according to an embodiment of this application.
Figure 10:
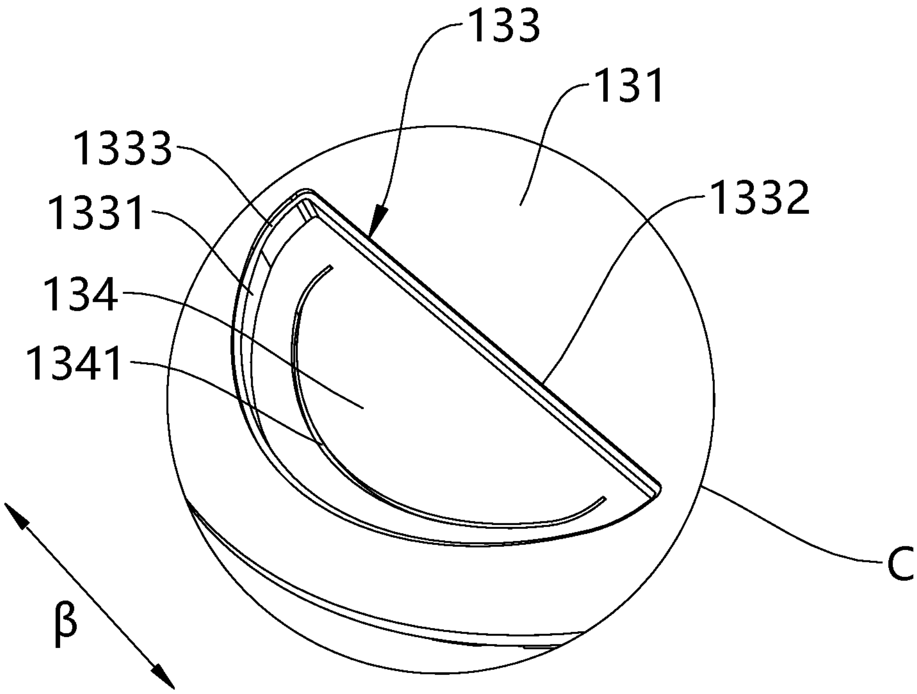
FIG. 10 is an enlarged view of part C in FIG. 9.

The side wall of the depression 133 includes the arc wall 1331 and the straight wall 1332. As shown in FIG. 9 and FIG. 10, the stepped surface 1333 is perpendicular to the arc wall 1331 and the straight wall 1332, and in the thickness direction $\beta$ of the end cover, the stepped surface 1333 divides the side wall constituted by the arc wall 1331 and the straight wall 1332 into upper and lower parts. The upper side wall and the lower side wall are staggered, and an opening of the depression 133 has a larger area than the bottom wall of the depression 133. In other embodiments, an opening of the depression 133 may have a smaller area than the bottom wall of the depression 133.

With the stepped surface 1333 provided, if the edge of the end cover 131 is subjected to compression toward the center, the upper side wall resists deformation first, and then the stress is transferred to the lower side wall through the stepped surface 1333 and then to the bottom wall. This effectively reduces influence on the weak portion 1341 caused by the edge of the end cover 131 being compressed, so as to prevent that the weak portion 1341 is damaged when the internal pressure of the battery cell 1 does not reach the threshold, improving the structural strength of the end cover 131.

Figure 11:
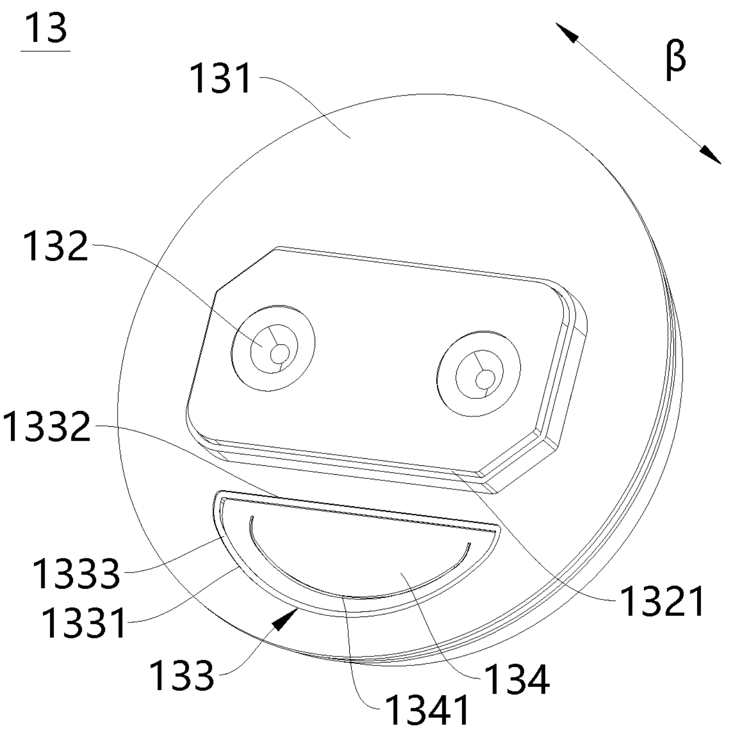
FIG. 11 is a schematic planar diagram of an end cover assembly according to an embodiment of this application.

According to some embodiments of this application, as shown in FIG. 11, an embodiment of this application provides an end cover assembly 13, and the end cover assembly 13 includes the end cover 131 and the electrode terminals 132 described in any one of the foregoing solutions. The two electrode terminals 132 are disposed in two through holes 135 on the end cover 131, so as to lead out electric energy of a battery cell 1 or charge electric energy into the battery cell 1.

According to some embodiments of this application, as shown in FIG. 11, an embodiment of this application provides an end cover assembly 13, and the end cover assembly 13 includes an end cover 131, a depression 133, and a weak portion 1341. The depression 133 is formed by the surface of the end cover 131 recessing in the thickness direction β, the bottom wall of the depression 133 forms a pressure relief mechanism 134, and the depression 133 includes an arc wall 1331 extending along the circumferential direction of the end cover 131. The weak portion 1341 is configured to crack when the pressure relief mechanism 134 is actuated, and the weak portion 1341 corresponds to the arc wall 1331 in shape.

The outline of the end cover 131 is circular, the arc wall 1331 extends along the circumferential direction of the end cover 131, the pressure relief mechanism 134 is formed on the bottom wall of the depression 133, the weak portion 1341 is disposed on the pressure relief mechanism 134, and the weak portion 1341 corresponds to the arc wall 1331 in shape.

The weak portion 1341 is a concave portion formed on the pressure relief mechanism 134, that is, another depression (for ease of differentiation, hereinafter referred to as a second depression) formed on the bottom wall of the depression 133. The bottom wall of the depression 133 is recessed from a surface in the thickness direction β of the end cover 131 to form the second depression, and the second depression thins the bottom wall of the depression 133 (that is, thins the pressure relief mechanism 134). The weak portion 1341 may be an indentation disposed on a surface of the pressure relief mechanism 134, or may be formed by stamping twice on the pressure relief mechanism 134, or integrally formed with the end cover 131 by casting. The weak portion 1341 is configured to define a prior damage position of the pressure relief mechanism 134. Optionally, when the internal pressure of the battery cell 1 reaches the threshold, the pressure relief mechanism 134 is actuated, and preferentially cracks from the weak portion 1341 to relieve the internal pressure.

The pressure relief mechanism 134 cracks along the weak portion 1341, so as to increase a valve opening area. In a case that an initial damage position and a subsequent cracking direction of the pressure relief mechanism 134 are defined, a valve opening position and direction of the pressure relief mechanism 134 can be controlled, which helps making preparations for the pressure relief mechanism 134 in advance, for example, providing protection in a relieving direction of the pressure relief mechanism 134, thereby improving the safety of the battery 100. A channel communicating the inside and the outside of the battery cell 1 formed after the pressure relief mechanism 134 cracks is used to discharge emissions, and the valve opening area in this application is a flow cross-section area of the channel.

The end cover assembly 13 provided in this application has high structural strength and can effectively open a valve to relieve pressure controllably in direction, improving the safety of the battery 100.

According to some embodiments of this application, as shown in FIG. 11, the weak portion 1341 is an arc, and depth of the weak portion 1341 varies in an extension direction of the circumference of the arc.

The weak portion 1341 is the arc, and corresponds to the arc wall 1331 in shape, facilitating processing and forming.

The depth of the weak portion 1341 varies in the extension direction of the circumference of the arc, such that the weak portion cracks in arc, helping the pressure relief mechanism relieve the internal pressure of the battery cell.

According to some embodiments of this application, as shown in FIG. 11, the end cover assembly 13 further includes the electrode terminals 132, the electrode terminal 132 includes a straight first wall 1321, the depression 133 further includes a straight wall 1332 connecting two ends of the arc wall 1331, and the first wall 1321 is substantially parallel to the straight wall 1332.

The first wall 1321 is a wall of the electrode terminal 132, and the wall is substantially parallel to the straight wall 1332 of the depression 133. The first wall 1321 being substantially parallel to the straight wall 1332 means that the first wall 1321 is parallel to the straight wall 1332, or an angle between the first wall 1321 and the straight wall 1332 is small (for example, less than 5°).

The first wall 1321 may be a wall of the electrode terminal 132 close to the depression 133, and the first wall 1321 is closer to the depression 133 compared with other walls of the electrode terminal 132.

The first wall 1321 is substantially parallel to the straight wall 1332, such that distance between the depression 133 and the electrode terminal 132 is small, which reduces the space occupied, and a cracking direction of the pressure relief mechanism 134 can be limited, which reduces the risk of contact between the pressure relief mechanism 134 and the electrode terminal 132 caused by damage of the pressure relief mechanism 134.

According to some embodiments of this application, in directions extending from the middle part to the two ends of the arc wall 1331, depth of the weak portion 1341 gradually decreases.

In the foregoing technical solution, the depth of the weak portion 1341 is set in the foregoing manner. When the pressure relief mechanism 134 is actuated, the weak portion 1341 cracks from the center to the two ends of the arc wall 1331, which limits the cracking direction of the pressure relief mechanism 134, helping the pressure relief mechanism 134 relieve the pressure.

According to some embodiments of this application, as shown in FIG. 6 and FIG. 11, the end cover assembly 13 further includes the two through holes 135, the through hole 135 is configured for mounting the electrode terminal 132, and the depth of the weak portion 1341 gradually decreases on one or two sides of the perpendicular bisector α of the connecting line of the two through holes 135 in the direction leaving the perpendicular bisector α.

In the direction leaving the perpendicular bisector α from the one side of the perpendicular bisector α of the connecting line of the two through holes 135, the depth of the weak portion 1341 may gradually decrease. Alternatively, in the directions leaving the perpendicular bisector α from the two sides of the perpendicular bisector α of the connecting line of the two through holes 135, the depth of the weak portion 1341 may gradually decrease.

In the foregoing technical solution, the deepest position of the weak portion 1341 is on the perpendicular bisector α. When the pressure relief mechanism 134 is actuated, the weak portion 1341 cracks in the direction leaving the perpendicular bisector α from the position corresponding to the perpendicular bisector α, which helps the pressure relief mechanism 134 quickly relieve the pressure, improving the safety.

According to some embodiments of this application, as shown in FIG. 4, FIG. 5, and FIG. 11, an embodiment of this application provides a battery cell 1, and the battery cell 1 includes a housing 12 and the end cover assembly 13. The housing 12 has an opening, and the end cover 131 closes the opening.

According to some embodiments of this application, the depression 133 is disposed on a side of the end cover 131 facing away from the housing 12.

The depression 133 is formed by recessing from an outer surface of the end cover 131, such that the pressure relief mechanism 134 is far away from the outer surface of the end cover 131, and is not prone to come into contact with other objects, to avoid being damaged. The outer surface of the end cover 131 mentioned herein is a surface of a side of the end cover 131 facing away from the housing 12.

Figure 12:
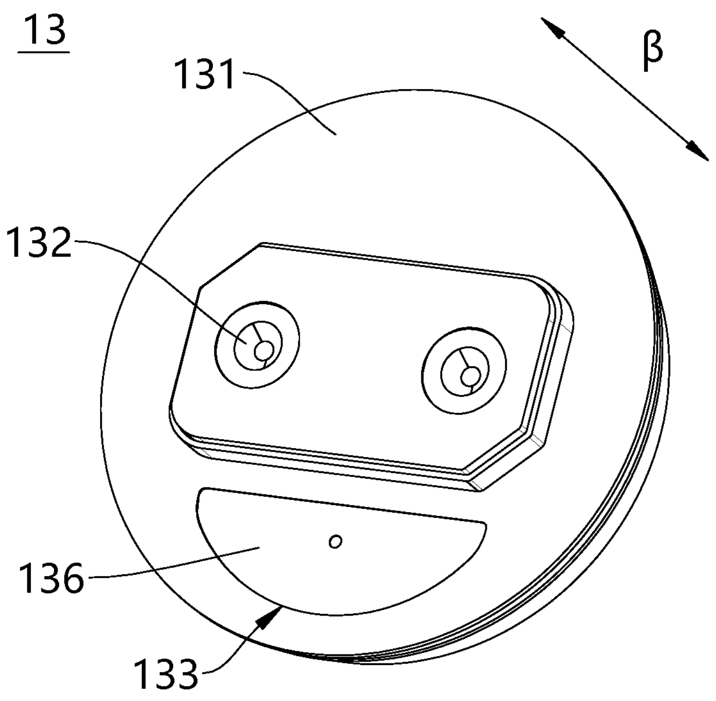
FIG. 12 is a schematic planar diagram of an end cover assembly according to another embodiment of this application.

In some embodiments, as shown in FIG. 12, the end cover assembly 13 of the battery cell 1 further includes a protective film 136, and the protective film 136 covers the opening of the depression 133 to protect the pressure relief mechanism 134.

According to some embodiments of this application, an embodiment of this application provides a battery 100, and the battery 100 includes the battery cell 1.

According to some embodiments of this application, an embodiment of this application provides a battery 100, and the battery 100 includes the end cover 131 or the end cover assembly 13.

According to some embodiments of this application, an embodiment of this application provides an electric device including the battery 100.

The electric device may be any one of the foregoing devices or systems using the battery 100.

According to some embodiments of this application, referring to FIG. 6 to FIG. 10, this application provides an end cover 131, the end cover 131 is circular, the end cover 131 is provided with two through holes 135 for mounting electrode terminals 132, the two through holes 135 are symmetrically arranged about the center of the end cover 131, and a perpendicular bisector α of a connecting line of the two through holes 135 passes through the center of the end cover 131.

The end cover 131 is further provided with a depression 133, and the depression 133 is symmetrical about the perpendicular bisector α. A side wall of the depression 133 includes an arc wall 1331 and a straight wall 1332, two ends of the arc wall 1331 connect two ends of the straight wall 1332 such that the side wall of the depression 133 forms an enclosure of a bow shape, and the arc wall 1331 and the straight wall 1332 have an arc transition such that the corner of the side wall of the depression 133 is rounded. The arc wall 1331 extends along a circumferential direction of the end cover 131, and a third spacing L3 is present between the arc wall 1331 and an edge of the end cover 131, where the third spacing L3 is 3.5 mm. The depression 133 is formed by recessing in a thickness direction from a surface of the end cover 131 facing away from the housing 12 of the battery cell 1, such that a bottom wall of the depression 133 is thinner than the end cover 131, and the bottom wall of the depression 133 is used as the pressure relief mechanism 134. A weak portion 1341 is disposed on the pressure relief mechanism 134, and the weak portion 1341 is a second depression or an indentation formed by stamping, such that thickness of the bottom wall of the depression 133 at the weak portion 1341 further decreases. The weak portion 1341 is symmetrical about the perpendicular bisector α, depth of the weak portion 1341 continuously and gradually changes, the weak portion 1341 reaches its deepest at an intersection point with the perpendicular bisector α, and the depth of the weak portion 1341 gradually decreases on two sides of the perpendicular bisector α in a direction leaving the perpendicular bisector α. When the internal pressure of the battery cell 1 reaches the threshold, the end cover 131 has a stress concentration on the perpendicular bisector α. On the whole, the pressure relief mechanism 134 is the thinnest at the intersection point of the weak portion 1341 and the perpendicular bisector α, but the intersection point has the largest stress, which achieves the effect of damage at a fixed point, ensuring that the pressure relief mechanism 134 cracks from the intersection point. Under the internal pressure of the battery cell 1, the pressure relief mechanism 134 further cracks along the weak portion 1341, and the pressure relief mechanism 134 is still connected to the straight wall 1332 after cracking, so as to prevent the pressure relief mechanism 134 from flying after being damaged, and define that emissions are discharged in a direction toward the edge of the end cover 131, improving safety.

A stepped surface 1333 is formed on the side wall of the depression 133, and the stepped surface 1333 divides the side wall of the depression 133 into upper and lower parts in a thickness direction β of the end cover. The upper side wall and the lower side wall are staggered, and an opening of the depression 133 has a larger area than the bottom wall of the depression 133, so as to facilitate discharge of the emissions.

The foregoing descriptions are merely preferred embodiments of this application which are not intended to limit this application. Persons skilled in the art understand that this application may have various modifications and variations. Any modification, equivalent replacement, and improvement made without departing from the spirit and principle of this application shall fall within the protection scope of this application.

The invention claimed is:

1. An end cover, applied to a battery cell and comprising: two through holes, running through the end cover for mounting electrode terminals; a depression, wherein the depression is formed by a surface of the end cover recessing in a thickness direction, and a bottom wall of the depression forms a pressure relief mechanism configured for relieving internal pressure of the battery cell; and a weak portion, disposed on the pressure relief mechanism; wherein depth of the weak portion gradually decreases on one or two sides of a perpendicular bisector of a connecting line of the two through holes in a direction leaving the perpendicular bisector.

2. The end cover according to claim 1, wherein the perpendicular bisector of the connecting line of the two through holes passes through a middle of the weak portion.

3. The end cover according to claim 2, wherein the weak portion is symmetrical about the perpendicular bisector.

4. The end cover according to claim 2, wherein the depression is symmetrical about the perpendicular bisector.

5. The end cover according to claim 2, wherein the end cover is circular, the perpendicular bisector passes through the center of the end cover, and the weak portion extends along a circumferential direction of the end cover.

6. The end cover according to claim 1, wherein the depression comprises an arc wall and a straight wall, the arc wall and the straight wall form an enclosure, and the arc wall extends along the circumferential direction of the end cover.

7. The end cover according to claim 6, wherein the arc wall corresponds to an arc angle less than or equal to 180°.

8. The end cover according to claim 6, wherein a first spacing is present between the weak portion and the arc wall;

a second spacing is present between the straight wall and two ends of the weak portion; and/or a third spacing is present between the arc wall and an edge of the end cover.

9. The end cover according to claim 6, wherein the arc wall and the straight wall have an arc transition.

10. The end cover according to any one of claim 1, wherein a stepped surface is formed on a side wall of the depression, and the stepped surface extends along a circumferential direction of the depression.

11. An end cover assembly, comprising:

an end cover;

a depression, wherein the depression is formed by a surface of the end cover recessing in a thickness direction, a bottom wall of the depression forms a pressure relief mechanism, and the depression comprises an arc wall extending along a circumferential direction of the end cover; and a weak portion, configured to crack when the pressure relief mechanism is actuated, wherein the weak portion corresponds to the arc wall in shape, wherein depth of the weak portion gradually decreases on one or two sides of a perpendicular bisector of a connecting line of the two through holes in a direction leaving the perpendicular bisector.

12. The end cover assembly according to claim 11, wherein the weak portion is an arc, and depth of the weak portion varies in an extension direction of the circumference of the arc.

13. The end cover assembly according to claim 11, wherein the end cover assembly further comprises electrode terminals, wherein each of the electrode terminals comprises a straight first wall, the depression further comprises a straight wall connecting two ends of the arc wall, and the first wall is substantially parallel to the straight wall.

14. The end cover assembly according to claim 13, wherein in directions extending from a middle part to the two ends of the arc wall, depth of the weak portion gradually decreases.

15. The end cover assembly according to claim 13, wherein the end cover assembly further comprises two through holes, the through hole is configured for mounting the electrode terminals, and depth of the weak portion gradually decreases on one or two sides of a perpendicular bisector of a connecting line of the two through holes in a direction leaving the perpendicular bisector.

16. A battery, comprising the end cover according to claim 1.

* * * * *